US011112540B2

(12) United States Patent
Takeshita et al.

(10) Patent No.: US 11,112,540 B2
(45) Date of Patent: Sep. 7, 2021

(54) ANTIFOGGING MEMBER

(71) Applicant: ENEOS CORPORATION, Tokyo (JP)

(72) Inventors: Ayano Takeshita, Yokohama (JP); Kaori Takano, Kawasaki (JP); Madoka Takahashi, Tokyo (JP); Takashi Seki, Yokohama (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/577,178

(22) Filed: Sep. 20, 2019

(65) Prior Publication Data

US 2020/0012018 A1    Jan. 9, 2020

Related U.S. Application Data

(63) Continuation of application No. PCT/JP2018/020775, filed on May 30, 2018.

(30) Foreign Application Priority Data

May 31, 2017    (JP) .............................. JP2017-108305

(51) Int. Cl.
G02B 1/18        (2015.01)
B29C 59/02       (2006.01)
G02B 27/00       (2006.01)

(52) U.S. Cl.
CPC ............ G02B 1/18 (2015.01); *G02B 27/0006* (2013.01); *Y10T 428/24479* (2015.01); *Y10T 428/24612* (2015.01); *Y10T 428/26* (2015.01)

(58) Field of Classification Search
CPC ..... G02B 1/18; G02B 27/0006; Y10T 428/26; Y10T 428/24479; Y10T 428/24612; B29C 2059/023
See application file for complete search history.

(56) References Cited

U.S. PATENT DOCUMENTS

2012/0132897 A1   5/2012   Seki et al.
2012/0156431 A1   6/2012   Suto et al.
(Continued)

FOREIGN PATENT DOCUMENTS

CN    106134287 A    11/2016
EP    2455786 A1     5/2012
(Continued)

OTHER PUBLICATIONS

Aug. 28, 2018 Written Opinion of International Searching Authority issued in International Patent Application No. PCT/JP2018/020775.
(Continued)

*Primary Examiner* — David Sample
*Assistant Examiner* — Donald M Flores, Jr.
(74) *Attorney, Agent, or Firm* — Oliff PLC

(57) ABSTRACT

An antifogging member has an concave-convex surface defined by convex portions and concave portions, a Fourier-transformed image obtained by applying two-dimensional fast-Fourier transform processing to an observation image of the concave-convex surface exhibits a circular or annular pattern having an origin for which the absolute value of the wave number is 0 $\mu m^{-1}$ as the substantial center thereof, the convex portions and the concave portions extend in random directions in plan view, the average pitch of the concave portions and convex portions of the concave-convex surface is in the range of 50-250 nm, and the water contact angle on a smooth surface formed from the material constituting the concave-convex surface is 90 degrees or less. The antifogging member has high abrasion resistance, minimal haze, and a small difference in chromaticity and transmittance when viewed from oblique and perpendicular directions, and the transmittance and chromaticity thereof are not azimuth dependent.

5 Claims, 3 Drawing Sheets

(56) References Cited

U.S. PATENT DOCUMENTS

| | | |
|---|---|---|
| 2013/0299796 A1 | 11/2013 | Masuyama et al. |
| 2015/0028325 A1 | 1/2015 | Seki et al. |
| 2016/0327695 A1* | 11/2016 | Masuyama .......... G02B 5/0221 |
| 2017/0199313 A1 | 7/2017 | Fukuda et al. |

FOREIGN PATENT DOCUMENTS

| | | |
|---|---|---|
| EP | 2664430 A1 | 11/2013 |
| EP | 3094160 A1 | 11/2016 |
| JP | 2008-158293 A | 7/2008 |
| JP | 2011-53334 A | 3/2011 |
| TW | 201532330 A | 8/2015 |
| TW | 201604000 A | 2/2016 |
| WO | 2011/007878 A1 | 1/2011 |
| WO | 2012/096368 A1 | 7/2012 |
| WO | 2013/161454 A1 | 10/2013 |
| WO | 2015/104968 A1 | 7/2015 |
| WO | 2015/156214 A1 | 10/2015 |
| WO | 2016/056277 A1 | 4/2016 |

OTHER PUBLICATIONS

Aug. 28, 2018 International Search Report issued in International Patent Application No. PCT/JP2018/020775.

Dec. 1, 2020 Office Action issued in Chinese Patent Application No. 201880031989.9.

Dec. 22, 2020 Extended Search Report issued in European Patent Application No. 18809402.3.

Mar. 8, 2021 Office Action issued in Taiwanese Patent Application No. 107118736.

* cited by examiner

ANTIFOGGING MEMBER

CROSS REFERENCE TO RELATED APPLICATION

This application is a continuation application of International Patent Application No. PCT/JP2018/020775 filed on May 30, 2018 claiming the benefit of priority of Japanese Patent Application No. 2017-108305 filed on May 31, 2017. The contents of International Patent Application No. PCT/JP2018/020775 and Japanese Patent Application No. 2017-108305 are incorporated herein by reference in their entities.

BACKGROUND OF THE INVENTION

Field of the Invention

The present invention relates to an antifogging member.

Description of the Related Art

Transparent base materials, such as inorganic glass, are conventionally used for optical members, such as window members and mirrors for buildings, industries, and automobiles, glasses, goggles, camera lenses, and solar panels. If such materials are exposed to an atmosphere having high humidity, water vapor would condense into waterdrops on their surfaces. This refracts or reflects light, thus deteriorating functions and beauty of the materials. As a means for inhibiting fogging (fog) due to the dew condensation on the base material surface, there is known a method for inhibiting fine waterdrops through improvement of the wettability of the base material surface with respect to water. For example, Japanese Patent Application Laid-open No. 2008-158293 discloses that fine protrusions or cones in a truncated conical or pyramidal shape or a conical or pyramidal shape, of which bottom surface is substantially a circle or a polygon, are formed on a base material surface to make the base material surface hydrophilic. Further, Japanese Patent Application Laid-open No. 2011-53334 discloses that a hydrophilic area with a fine concave and convex structure and a hydrophobic area without the fine concave and convex structure are formed on a base material to move water from the hydrophobic area to the hydrophilic area, thus inhibiting a base material surface from fogging. International Publication No. WO2015/156214 describes that a concave and convex pattern formed from elongated concave and convex portions having a width of less than 10 μm is formed on a base material so that water droplets spread in an extending direction of the concave and convex portions to form a water film (a large waterdrop not scattering light), thus inhibiting a base material surface from fogging.

However, the inventors of the present application revealed, through the diligent studies and investigations, that the base material with fine protrusions or cones in a truncated conical or pyramidal shape or a conical or pyramidal shape, of which bottom surface is substantially a circle or a polygon, as described in Japanese Patent Application Laid-open No. 2008-158293 has insufficient antifogging properties. The base material having the structure as described in Japanese Patent Application Laid-open No. 2011-53334 can inhibit fogging due to relatively large waterdrops, such as raindrops, and fogging caused under a situation with high water content where waterdrops are likely to become large, such as dew condensation in bathrooms. However, when the base material having the structure as described in Japanese Patent Application Laid-open No. 2011-53334 is used for mirrors in washrooms, indoor glass materials, and the like, fogging due to relatively small waterdrops caused in an indoor dew condensation process can not be inhibited. The antifogging member described in International Publication No. WO2015/156214 can inhibit fogging due to small waterdrops, but the mechanical strength (abrasion resistance) and the transmittance (transparence) in an oblique direction are needed to be improved to inhibit variation in transmittance and chromaticity (color, tinge) depending on the angle from which it is viewed. An object of the present invention is to provide an antifogging member having good antifogging properties, high abrasion resistance, a small haze, a small difference in transmittance and chromaticity between when viewed obliquely and when viewed from a vertical direction, and a small azimuth angle dependency of transmittance and chromaticity.

SUMMARY OF INVENTION

According to the first aspect of the present invention, there is provided an antifogging member having a concave and convex surface defined from a convex portion and a concave portion, wherein a Fourier-transformed image obtained by performing a two-dimensional fast Fourier-transform processing on an observation image of the concave and convex surface shows a circular or annular pattern substantially centered at an origin at which an absolute value of wavenumber is 0 $\mu m^{-1}$, the convex portion and the concave portion extend in random directions as viewed in plan view, and an average pitch of concavities and convexities in the concave and convex surface is in a range of 50 to 250 nm, and a contact angle of water on a flat and smooth surface formed from a material forming the concave and convex surface is not more than 90°.

The antifogging member of the present invention has good antifogging properties, high abrasion resistance, a small haze, a small difference in transmittance and chromaticity between when viewed obliquely and when viewed from the vertical direction, and the transmittance and chromaticity do not depend on an azimuth angle. The antifogging member of the present invention can thus be suitably used for a variety of uses.

DESCRIPTION OF THE PREFERRED EMBODIMENTS

Figure 1:
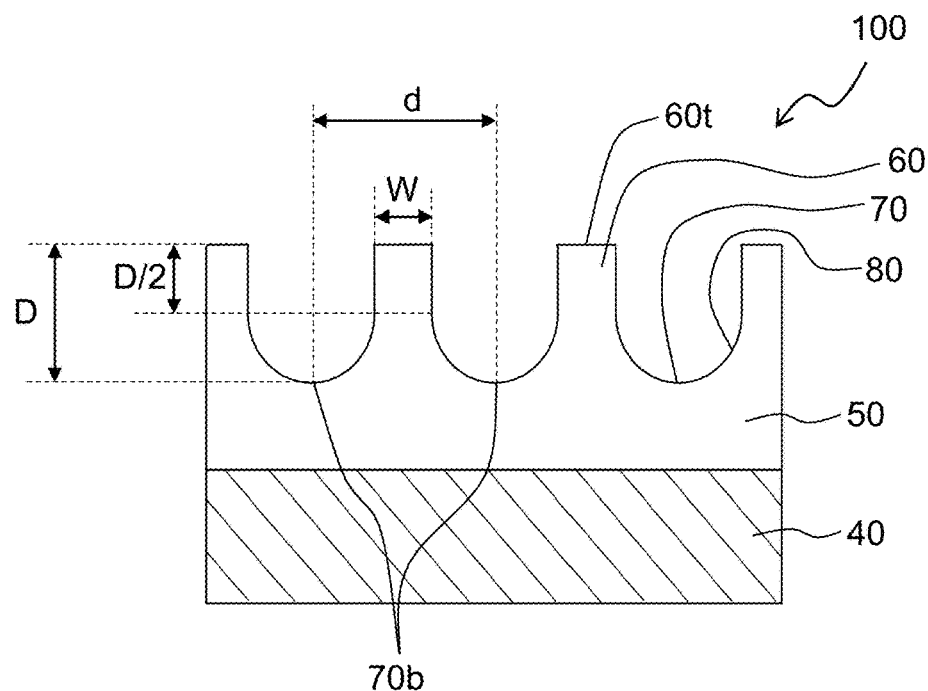
FIG. 1 is a schematic cross-sectional view of an antifogging member according to an embodiment.

As shown in FIG. 1, an antifogging member 100 according to this embodiment includes a substrate 40 and a concave-convex structure layer 50 formed on the substrate 40. The concave-convex structure layer 50 includes convex portions 60 and concave portions 70 defined by the convex portions 60. In that configuration, the concave-convex structure layer 50 has a concave-convex surface 80.

The substrate 40 may be any substrate. The substrate 40 is exemplified, for example, by substrates made using transparent inorganic materials, such as glass; substrates made using resins including, for example, polyester (polyethylene terephthalate, polybutylene terephthalate, polyethylene naphthalate, polyarylate, and the like), acrylic-based resin (polymethyl methacrylate and the like), polycarbonate, polyvinyl chloride, styrene-based resin (ABS resin and the like), cellulose-based resin (triacetylcellulose and the like), polyimide-based resin (polyimide resin, polyimideamide resin, and the like), and cycloolefin polymer; substrates made using metal; and substrates made using plastic. The substrate 40 may be hydrophilic or hydrophobic. A hydrophilization treatment may be performed on the surface of the substrate 40 through an $O_3$ process or the like.

The concave-convex structure layer 50 is made using a material in which the contact angle of water on a flat and smooth surface of the material is not more than 90°. In the present application, "contact angle of water on a flat and smooth surface" means an angle formed by a flat and smooth surface having no concavities and convexities that is made using a certain material and a waterdrop formed on the surface. The surface is more hydrophobic as the contact angle of water on the flat and smooth surface is greater. The contact angle of water on the flat and smooth surface can be measured by using a contact angle meter (e.g., a model "PCA-11" produced by Kyowa Interface Science Co., LTD.). Specifically, a substrate that has a flat and smooth surface and is made using a material to be measured (including a substrate having a surface on which a flat and smooth film of the material to be measured is formed) is statically placed on a horizontal table of the contact angle meter. A syringe containing ion-exchanged water is set above the horizontal table of the contact angle meter, and a waterdrop of 2 μL is formed at the tip of the syringe. The horizontal table is moved upward to bring the flat and smooth surface into contact with the waterdrop. Then the horizontal table is moved downward so that the waterdrop is statically placed on the flat and smooth surface for one second. Here, an angle that is formed by the flat and smooth surface and a straight line connecting the top of waterdrop and one of the left and right ends of the waterdrop is obtained. The obtained angle is doubled to determine the contact angle of water.

Examples of the material in which the contact angle of water on the flat and smooth surface is not more than 90° include silicon (Si)-based materials including, for example, silica, SiN, and SiON; titanium (Ti)-based materials such as $TiO_2$: materials based on indium-tin oxide (ITO); and inorganic materials including, for example, ZnO, ZnS, $ZrO_2$, $Al_2O_3$, $BaTiO_3$, $Cu_2O$, MgS, AgBr, CuBr, BaO, $Nb_2O_5$, and $SrTiO_2$. Each of the inorganic materials may be xerogel obtained by curing a precursor (sol) of the inorganic material through a sol-gel method. The xerogel has a three-dimensional network formed by strong covalent bonds such as Si—O bond, and mechanical strength thereof is satisfactory. The concave-convex surface 80 is hardened by forming the concave-convex structure layer 50 from the above inorganic material(s), which inhibits the surface of the antifogging member 100 from being damaged. Each of the inorganic materials may contain a material with a photocatalytic function, such as $TiO_2$. This makes it possible to improve hydrophilic properties of the concave-convex surface 80, to improve antifogging properties of the antifogging member 100, and to provide a self-cleaning function in the antifogging member 100. Each of the inorganic materials contains no alkali metal that may decrease the crystallinity of material with the photocatalytic function and may consequently decrease photocatalytic activity. The material with the photocatalytic function can thus maintain high photocatalytic activity.

The concave-convex structure layer 50 may be made using resin materials as described in International Publication No. WO2015/156214 or composite materials composed by such resin material(s) and the above-mentioned inorganic material(s). The inorganic materials, the resin materials, or the composite materials thereof may contain publicly known fine particles and/or filler to adjust a refractive index, to allow the concave-convex structure layer 50 to have high hardness, and the like. The inorganic materials, the resin materials, or the composite materials thereof may contain an ultraviolet absorber. The ultraviolet absorber has the function or effect to inhibit deterioration of the concave-convex structure layer 50 by absorbing ultraviolet rays and converting light energy into something harmless such as heat. Any ultraviolet absorber, such as those disclosed in International Publication WO2016/056277, may be used as the ultraviolet absorber.

Figure 2:
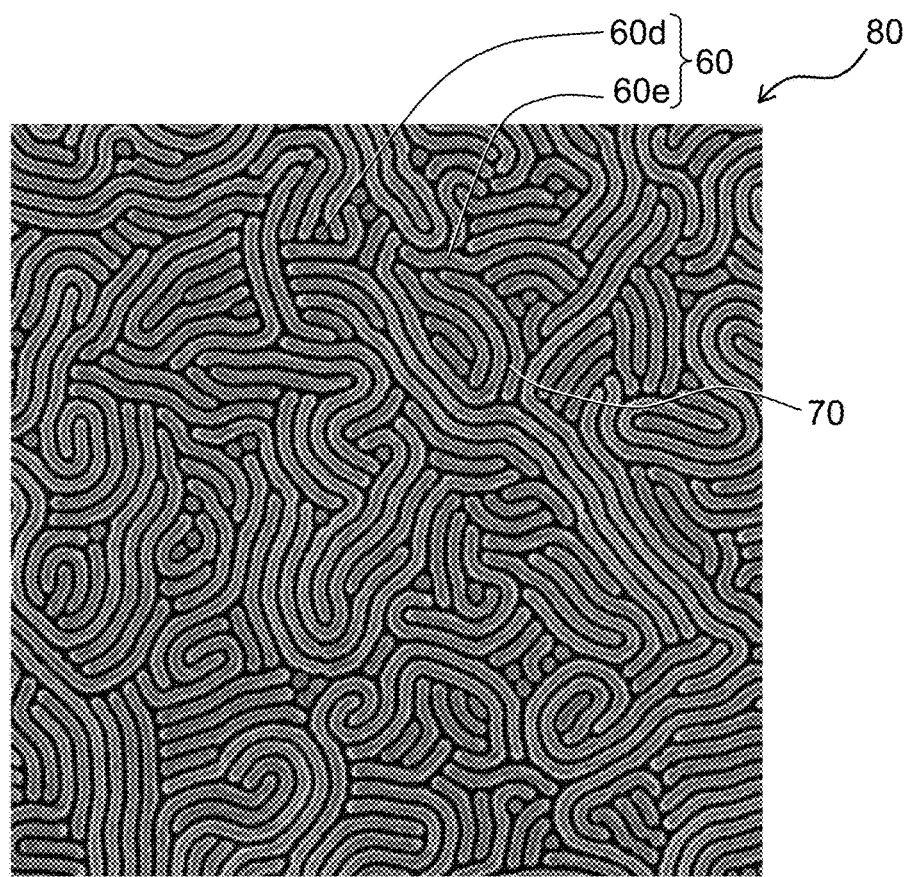
FIG. 2 is a planar SEM image of an antifogging member in Example 6 and shows an exemplary planar structure of a concave and convex surface (concave-convex surface) of the antifogging member according to the embodiment.

The concave-convex structure layer 50 includes the convex portions 60. Portions interposed or surrounded by the convex portions 60 are the concave portions 70. FIG. 2 shows an exemplary planar structure of the concave-convex surface 80. The concave-convex surface 80 in FIG. 2 is defined by multiple convex portions 60 (light-colored portions) and a concave portion 70 (a dark-colored portion) surrounding the convex portions 60. The convex portions 60 are formed by extending portions 60e and dots 60d. Each extending portion 60e has an elongated shape extending straight or bending (meandering) randomly in ununiform directions. The extending directions, bending directions (meandering directions), and extending lengths of the extending portions 60e are ununiform. Part or all of the extending portions 60e may branch off at intermediate portions thereof. Each dot 60d has a circular shape or an oval shape. The circular shape or oval shape includes a substantially circular shape or a substantially oval shape. The convex portions 60 may be formed only by the extending portions 60e. Namely, the dots 60d are not indispensable. The concave portion 70 extends randomly in ununiform directions to surround the convex portions 60 so that the concave portion 70 continues two-dimensionally as a whole. As shown in Examples described below, the antifogging member 100 has higher antifogging properties by allowing the concave portion 70 to continue two-dimensionally as a whole. The reason thereof is considered as follows. Namely, when a waterdrop is adhered to the concave-concave surface 80, air in the concave portion 70 under the waterdrop is pushed out of the concave portion 70 via the continuous concave portion 70. This causes the waterdrop to spread over the concave-convex surface 80 quickly, and the waterdrop and a nearby waterdrop(s) unite each other to form a water film (a waterdrop having a size not scattering light). As a result, a small waterdrop scattering light (i.e., a small waterdrop generating haze) disappears quickly.

In the concave-convex surface 80 in FIG. 2, majority of the multiple convex portions 60 are preferably elongated convex portions, and the rate of convex portions that are short in its extending direction or that have substantially a dot shape is preferably small. Specifically, the total of perimeters of convex portions 60 included in the multiple convex portions 60 and having a perimeter (contour) of not more than seven times an average pitch of concavities and convexities described below may be not more than 10% of the total of perimeters of the multiple convex portions 60. The convex portions having a perimeter not more than seven times the average pitch of concavities and convexities are short in its extending direction, and the length in its extending direction is approximately not more than three times the average pitch. When the rate of such convex portions is not more than 10%, the antifogging member 100 has a haze of less than 1% as shown in Examples described below. The antifogging member of which haze is less than 1% can be suitably used for uses including mirrors, windows, camera lenses, and the like.

"The total of perimeters of the multiple convex portions 60" and "the total of perimeters of convex portions included in the multiple convex portions 60 and having a perimeter of not more than seven times an average pitch of concavities and convexities" can be determined as follows. A square having each side not less than 40 times the average pitch of concavities and convexities is cut out from a planar SEM image of the concave-convex surface. The cut-out image is binarized into white and black by software for image processing and image analysis (e.g., ImageJ). Perimeters of white portions that are not brought into contact with the outer circumference of the image are determined by the software for image processing and image analysis. A value obtained by summing up all of the perimeters determined by the above software corresponds to "the total of perimeters of the multiple convex portions 60". A value obtained by summing up all of the perimeters that are included in the perimeters determined by the software and are not more than seven times the average pitch of concavities and convexities corresponds to "the total of perimeters of convex portions included in the multiple convex portions 60 and having a perimeter of not more than seven times an average pitch of concavities and convexities".

Figure 3:
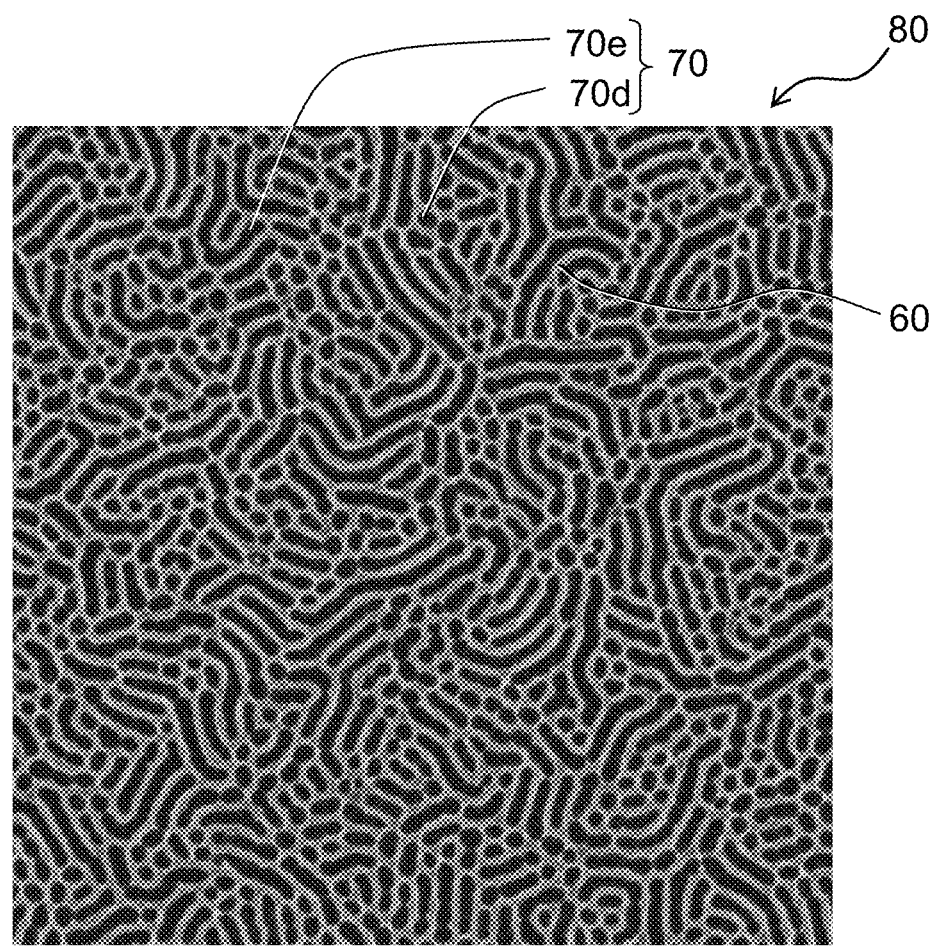
FIG. 3 is a planar SEM image of an antifogging member in Example 1 and shows an exemplary planar structure of the concave-convex surface of the antifogging member according to the embodiment.

FIG. 3 is another example of the planar structure of the concave-convex surface 80. In FIG. 3, the concave-convex surface 80 is defined by multiple concave portions (dark-colored portions) 70 and a convex portion (a light-colored portion) 60 surrounding the concave portions 70. It can thus be said that the shape of concavities and convexities in the example of the planar structure depicted in FIG. 3 is reversed to that of concavities and convexities in the example of the planar structure depicted in FIG. 2. In FIG. 3, the concave portions 70 are formed by extending portions 70e and dots 70d. Each extending portion 70e has an elongated shape extending straight or bending (meandering) randomly in ununiform directions. The extending directions, bending directions (meandering directions), and extending lengths of the extending portions 70e are ununiform. Part or all of the extending portions 70e may branch off at intermediate portions thereof. Each dot 70d has a circular shape or an oval shape. The concave portions 70 may be formed only by the extending portions 70e. Namely, the dots 70d are not indispensable. The convex portion 60 extends randomly in ununiform directions to surround the concave portions 70 so that the convex portion 60 continues two-dimensionally as a whole. The convex portion 60 continuing two-dimensionally is not likely to be deformed (fall down) when the surface of the antifogging member 100 is rubbed, enhancing the abrasion resistance of the antifogging member 100. Further, as shown in Examples described below, when the concave-convex surface 80 has the planar structure in which the convex portion 60 continues two-dimensionally to surround the concave portions 70, light is not likely to be scattered at the concave-convex surface 80, which makes the haze of the antifogging member 100 small. Specifically, a haze of less than 1% is achieved.

In the both examples in FIGS. 2 and 3, the extending directions, bending directions (meandering directions), and extending lengths of the concave portion(s) 70 and the convex portion(s) 60 are ununiform. The concave portion(s) 70 and the convex portion(s) 60 are arranged isotropically as a whole. The concave-convex surface 80 having the concave portion(s) 70 and the convex portion(s) 60 is clearly different from, for example, a concave-convex surface formed from a convex portion(s) or a convex portion(s) regularly arranged, such as stripe, waved stripe, or zigzag and a concave-convex surface formed from a convex portion(s) or a convex portion(s) having a dot shape. When the concave portion(s) 70 and the convex portion(s) 60 are arranged isotropically, the transmittance and chromaticity when the antifogging member 100 is viewed obliquely are constant without depending on an azimuth angle. Further, compared to a surface formed having a regular pattern, such as stripe, the difference in transmittance and chromaticity between when viewed obliquely and when viewed from a vertical direction is small. When the concave-convex structure layer 50 having the isotropic concave-convex surface 80 is cut along any plane orthogonal to the surface of the substrate 40, the concave and convex cross-section repeatedly appears.

Both of the convex portion(s) 60 and the concave portion(s) 70 of the concave-convex surface 80 may be formed by extending portions that extend meanderingly and have an elongated shape. In that configuration, the convex portion(s) 60 lengthen(s) continuously (or connected), and thus the convex portion(s) 60 is/are not likely to be deformed (fall down) when the surface of the antifogging member 100 is rubbed. Namely, the antifogging member 100 has high abrasion resistance.

Figure 4:
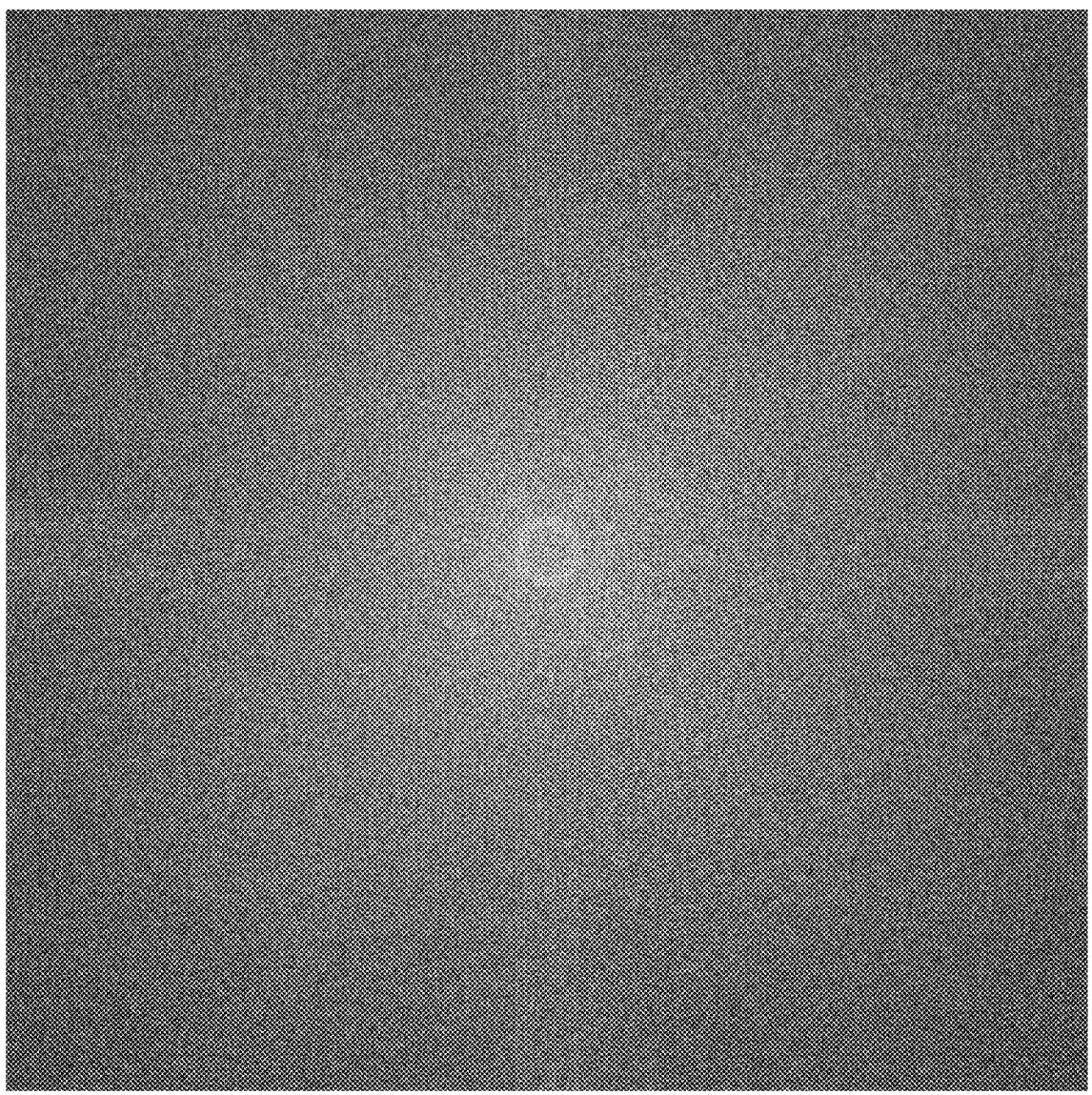
FIG. 4 is an example of a Fourier-transformed image of an image observed in plan view (plan-observed image) of the concave-convex surface of the antifogging member according to the embodiment.

Performing two-dimensional fast Fourier transform processing on an image obtained by observing the concave-convex surface 80 with a scanning probe microscope, an electron microscope, or the like results in a Fourier-transformed image showing a circular or annular pattern substantially centered at an origin at which an absolute value of wavenumber is 0 $\mu m^{-1}$, as shown in FIG. 4. The circular or annular pattern may be present within a region where the absolute value of wavenumber is in a range of 4.0 to 20 The circular pattern of the Fourier-transformed image is a pattern observed due to gathering of bright spots in the Fourier-transformed image. The term "circular" herein means that the pattern of the gathering of bright spots looks like a substantially circular shape, and is a concept further including a case where part of the contour of the circular pattern looks like a convex shape or a concave shape. The term "annular" means that the pattern of the gathering of bright spots looks like a substantially annular shape. The term "annular" is a concept further including a case where a shape of an outer circle or inner circle of the ring looks like a substantially circular shape and a case where part of the contour of the outer circle or the inner circle of the ring looks like a convex shape or a concave shape. The phrase "the circular or annular pattern may be present within a region where the absolute value of wavenumber is in a range of 4.0 to 6.7 $\mu m^{-1}$" means that not less than 30% (more preferably not less than 50%, further preferably not less than 80%, and particularly preferably not less than 90%) of bright spots forming the Fourier-transformed image are present within the region where the absolute value of wavenumber is in the range of 4.0 to 6.7 $\mu m^{-1}$.

Regarding the relationship between the concave-convex shape in plan view and the Fourier-transformed image, the followings are revealed. Namely, when spaced intervals between adjacent concave portions or adjacent convex portions are ununiform and when the arrangement of the concave portions and convex portions and the extending directions thereof are isotropic (having no anisotropy and no orientation), the Fourier-transformed image has a random pattern (no pattern). On the other hand, although the arrangement of the concavities and convexities as well as the extending directions thereof are isotropic as a whole, the spaced intervals between adjacent concave portions or adjacent convex portions may concentrate in a certain value range. In that case, the Fourier-transformed image is circular or annular. When the spaced intervals between adjacent concave portions or adjacent convex portions are constant (uniform), the annular shape appearing in the Fourier-transformed image is sharp.

The two-dimensional fast Fourier transform processing can be easily performed on an image observed in plan view (plan-observed image) through electronic image processing by using a computer equipped with software for the two-dimensional fast Fourier transform processing.

The average pitch of concavities and convexities of the concave-convex surface 80 may be in a range of 50 to 250 nm. Making the average pitch of concavities and convexities not less than the lower limit (50 nm) results in satisfactory antifogging properties. Making the average pitch of concavities and convexities not more than the upper limit (250 nm) inhibits the concave-convex surface 80 from scattering visible light, which improves the transmittance of the antifogging member 100. In the present application, the average pitch of concavities and convexities means an average value of spacing distances d (i.e., concave-convex pitches) between tops 60t of adjacent convex portions 60 or between bottoms 70b of adjacent concave portions 70 in a cross-section of the concave-convex surface 80 cut along a plane perpendicular to the extending direction of the convex portion 60 and/or the concave portion 70. The average pitch of concavities and convexities can be obtained using a scanning probe microscope, an electron microscope, or the like.

The average value of depth D of convexities and concavities (height of convex portions or depth of concave portions) of the concave-convex surface 80, namely, the average depth of concavities and convexities of the concave-convex surface 80 may be in a range of 15 to 500 nm or in a range of 25 to 500 nm. Making the average depth of concavities and convexities not less than 15 nm can result in satisfactory antifogging properties of the antifogging member 100. Making the average depth of concavities and convexities not more than 500 nm can maintain the mechanical strength (abrasion resistance) of the antifogging member. In the present application, a term "depth D of concavities and convexities" means the difference in height between the lowest spot (bottom 70b) of the concave portion 70 and the highest spot (top 60t) of the convex portion 60, the concave portion 70 and the convex portion 60 being adjacent to each other, in the cross-section of the concave-convex surface 80 cut along the plane perpendicular to the extending direction of the convex portion 60 and/or the concave portion 70.

The cross-section of the convex portion 60 or the concave portion 70 cut along the plane perpendicular to the extending direction may have any shape, such as a rectangle, a tapered shape including a triangle, a trapezoid, and the like, and a shape in which corner(s) of the rectangle, triangle, trapezoid, and the like is/are rounded. The cross-section may have a shape of a semicircle, a semi-ellipse (semi-oval), or a shape with a curved outline like a parabola. Further, finer concavities and convexities may be formed in the surfaces of the convex portions 60 and/or concave portions 70. The height (depth) of the finer concavities and convexities may be not more than one-fifth of the height D of the convex portions 60 (depth of the concave portions 70).

In the cross-section of the convex portion 60, the average value of widths W of the convex portions 60 (hereinafter referred to as "the width of the convex portion 60" as appropriate) at a position lower than the top 60t of the convex portion 60 by D/2 may be in a range of 20 to 95% of the average pitch of the concavities and convexities or in a range of 50 to 95% of the average pitch of the concavities and convexities. When the width W of the convex portion 60 is not less than 20% of the average pitch, the antifogging member 100 can have high abrasion resistance as shown in Examples described below. When the width W of the convex portion 60 is not less than 50% of the average pitch, the antifogging member 100 can have higher abrasion resistance. When the width W of the convex portion 60 is not more than 95% of the average pitch, the antifogging member 100 is easily manufactured through nanoimprinting process. The width W of the convex portion 60 can be measured using a cross-sectional image obtained through electron microscope observation.

The antifogging member according to the present invention may not have the substrate 40 and the concave-convex structure layer 50, provided that the antifogging member has a concave-convex surface made using a material in which the contact angle of water on a flat and smooth surface of the material is not more than 90°. For example, it is possible to also use an object in which a surface of a substrate made using a material, in which the contact angle of water on a flat and smooth surface of the material is not more than 90°, is formed into concavities and convexities; and an object in which a surface of any substrate is formed into concavities and convexities and the surface is coated with a material in which the contact angle of water on a flat and smooth surface of the material is 90°, as the antifogging member according to the present invention.

The antifogging member 100 can be manufactured by a nanoimprinting process described in International Publication No. WO2015/156214. The mold used for nanoimprinting process can be manufactured by using a master, which is formed by a method of utilizing the self-organization or self-assembly (micro phase separation) of a block copolymer through heating, as described in International Publication No. WO2012/096368 of the applicants of the present invention (hereinafter referred to as "BCP (Block Copolymer) thermal annealing method" as appropriate); a method of utilizing the self-organization or self-assembly of a block copolymer under a solvent atmosphere, as described in International Publication No. WO2013/161454 of the applicants of the present invention (hereinafter referred to as "BCP solvent annealing method" as appropriate); or a method of heating and cooling a vapor deposited film on a polymer film to form concavities and convexities of wrinkles on a surface of polymer, as disclosed in International Publication No. WO2011/007878 A1 of the applicants of the present invention (hereinafter referred to as "BKL (Buckling) method" as appropriate). Those molds are manufactured through the self-organization or self-assembly, and thus an area of a pattern surface is not restricted. The antifogging member having a large area can thus be manufactured easily.

EXAMPLES

The antifogging member according to the present invention is specifically explained below with examples and comparative examples. The present invention, however, is not limited to the examples and comparative examples. The present invention may be appropriately modified or changed within the range of the technical ideas described in the following claims.

Example 1

There was prepared a random copolymer (produced by Polymer Source. Inc.) made using polystyrene (hereinafter referred to as "PS" in an abbreviated manner as appropriate) and polymethyl methacrylate (hereinafter referred to as "PMMA" in an abbreviated manner as appropriate) and containing a hydroxyl group at an end thereof. The random copolymer was dissolved in toluene to obtain a random copolymer solution.

Further, there was prepared a block copolymer (produced by Polymer Source. Inc.) made using PS and PMMA, as follows. The block copolymer was dissolved in toluene to obtain a block copolymer solution.

Mn of block copolymer=1,010,000
Volume ratio between PS segment and PMMA segment (PS:PMMA)=53.9:46.1
Molecular weight distribution (Mw/Mn)=1.18
The volume ratio between the PS segment and the PMMA segment (the PS segment: the PMMA segment) in the block copolymer was calculated on the assumption that the density of polystyrene was 1.05 g/cm$^3$ and the density of polymethyl methacrylate was 1.19 g/cm$^3$. The number average molecular weights (Mn) and the weight average molecular weights (Mw) of polymer segments or polymers were measured by using a gel permeation chromatography (Model No.: "GPC-8020" manufactured by TOSOH CORPORATION, in which TSK-GEL SuperH1000, SuperH2000, SuperH3000, and SuperH4000 were connected in series).

A Si wafer with an oxidized film was coated with the random copolymer solution by spin casting, and heated to 170° for two days under vacuum. Then, the Si wafer was subjected to ultrasonic cleaning in toluene and dried. The Si wafer was coated with the block copolymer solution by spin casting and dried by use of a heating plate. A block copolymer film was thus formed on the Si wafer.

The Si wafer with the block copolymer film was put into a dish, and the dish was placed in a closed container with a glass window filled with Tetrahydrofuran (THF). Nitrogen gas circulated through the closed container to keep the thickness of the block copolymer film constant while the thickness of the block copolymer film was measured through the glass window by an interference-type film thickness meter. A solvent annealing process was performed while the degree of swelling of the block copolymer film was made to be constant.

After the Si wafer with the block copolymer film was taken out of the closed container, PMMA was selectively cut by irradiating the block copolymer film with ultraviolet rays, and the Si wafer was immersed in acetone to dissolve PMMA. Both the convex portions made from PS and the concave portions formed by removing PMMA had elongated shapes extending and bending in random or erratic directions.

Subsequently, dry etching was performed on the oxidized film by using PS as a mask. This remained, on the Si wafer, the oxidized film having a planar shape that corresponded to the planar shape of PS. Next, dry etching was performed on the Si wafer by using the oxidized film as a mask. Concavities and convexities were thus formed in a surface of the Si wafer.

The surface of the Si wafer was subjected to a release process by using OPTOOL (produced by DAIKIN INDUSTRIES). Then, the Si wafer was coated with a fluorine-containing acrylic-based UV curable resin (hereinafter referred to as "a first UV curable resin" as appropriate) by drop casting, and the first UV curable resin was sandwiched between the Si wafer and a PET film (Cosmoshine A-4300 manufactured by TOYOBO CO., LTD.). The first UV curable resin was irradiated with UV light and cured. Then, the first UV curable resin was released from the Si wafer. Concavities and convexities were thus formed in a surface of the first UV curable resin. The shape of concavities and convexities in the surface of the first UV curable resin was reversed to that of concavities and convexities in the Si wafer.

A solution of precursor of silica (sol) was prepared, and a surface of a glass substrate was coated with the solution to form a precursor solution film.

The concave-convex surface of the first UV curable resin was pressed against the precursor solution film. Then, the precursor solution film was heated using a heating plate to cure the precursor solution film. Silica was thus formed. After that, the first UV curable resin was released from the silica. This resulted in concavities and convexities in a surface of the silica. The shape of concavities and convexities in the surface of the silica was reversed to that of concavities and convexities in the first UV curable resin. Accordingly, the antifogging member including the glass substrate and the concave-convex structure layer formed from silica was produced.

A glass substrate was coated with the solution of precursor of silica and was annealed. A flat and smooth surface made from silica was thus produced. The contact angle of water on the flat and smooth surface made from silica was measured with a contact angle meter (PCA-11 produced by Kyowa Interface Science Co., LTD), which was 30°.

Example 2

The antifogging member was produced similarly to Example 1 except that the time of solvent annealing process performed on the block copolymer film and the degree of swelling of the block copolymer film were changed and that the concave-convex depth of the surface of the Si wafer was changed by adjusting the conditions for dry etching performed on the Si wafer.

Example 3

The antifogging member was produced similarly to Example 1 except that the concave-convex depth of the surface of the Si wafer was changed by adjusting the conditions for dry etching performed on the Si wafer.

Example 4

The antifogging member was produced similarly to Example 1 except that the time of solvent annealing process performed on the block copolymer film and the degree of swelling of the block copolymer film were changed and that the concave-convex depth of the surface of the Si wafer was changed by adjusting the conditions for dry etching performed on the Si wafer.

Example 5

Concavities and convexities were formed in the surface of the Si wafer similarly to Example 1 except that the time of solvent annealing process performed on the block copolymer film and the degree of swelling of the block copolymer film were changed and that the concave-convex depth of the surface of the Si wafer was changed by adjusting the conditions for dry etching performed on the Si wafer. Similar to Example 1, concavities and convexities, of which shape was reversed to that of concavities and convexities in the Si wafer, were formed in the surface of the first UV curable resin. The first UV curable resin was coated with a fluorine-containing acrylic-based UV curable resin (hereinafter referred to as "a second UV curable resin" as appropriate) by drop casting, and the second UV curable resin was sandwiched between the first UV curable resin and a PET film. The second UV curable resin was irradiated with UV light and cured. Then, the second UV curable resin was released from the first UV curable resin. Concavities and convexities were thus formed in the surface of the second UV curable resin. The shape of concavities and convexities in the surface of the second UV curable resin was reversed to that of concavities and convexities in the first UV curable resin. This means the shape of concavities and convexities in the surface of the second UV curable resin was the same as that of concavities and convexities in the Si wafer.

Concavities and convexities, of which shape was reversed to that of concavities and convexities in the second UV curable resin, were formed in the surface of the silica by the same method as Example 1, except that the second UV curable resin was pressed against the precursor solution film instead of the first UV curable resin. The antifogging member was thus obtained.

Example 6

Concavities and convexities were formed in the surface of the Si wafer similarly to Example 4 except that the time of solvent annealing process performed on the block copolymer film and the degree of swelling of the block copolymer film were changed and that the concave-convex depth of the surface of the Si wafer was changed by adjusting the conditions for dry etching performed on the Si wafer. Similar to Example 5, there was produced the second UV curable resin in which concavities and convexities having the shape reversed to that of concavities and convexities in the first UV curable resin were formed (i.e., the shape of concavities and convexities in the second UV curable resin was the same as that of concavities and convexities in the Si wafer). Then, concavities and convexities, of which shape was reversed to that of concavities and convexities in the second UV curable resin, were formed in the surface of the silica. The antifogging member was thus obtained.

Example 7

Concavities and convexities were formed in the surface of the Si wafer similarly to Example 4 except that the time of solvent annealing process performed on the block copolymer film and the degree of swelling of the block copolymer film were changed and that the concave-convex depth of the surface of the Si wafer was changed by adjusting the conditions for dry etching performed on the Si wafer. Similar to Example 5, there was produced the second UV curable resin in which concavities and convexities having the shape reversed to that of concavities and convexities in the first UV curable resin were formed (i.e., the shape of concavities and convexities in the second UV curable resin was the same as that of concavities and convexities in the Si wafer). Then, concavities and convexities, of which shape was reversed to that of concavities and convexities in the second UV curable resin, were formed in the surface of the silica. The antifogging member was thus obtained.

Comparative Example 1

There was prepared a block copolymer (produced by Polymer Source. Inc.) made using PS and PMMA, as follows. The block copolymer was dissolved in toluene to obtain a block copolymer solution.

Mn of block copolymer=1,550,000

Volume ratio between PS segment and PMMA segment (PS:PMMA)=52.5:47.5

Molecular weight distribution (Mw/Mn)=1.28

The volume ratio between the PS segment and the PMMA segment (the PS segment: the PMMA segment) in the block copolymer was calculated on the assumption that the density of polystyrene was 1.05 g/cm$^3$ and the density of polymethyl methacrylate was 1.19 g/cm$^3$. The number average molecular weights (Mn) and the weight average molecular weights (Mw) of polymer segments or polymers were measured by using a gel permeation chromatography (Model No.: "HLC-8320GPC" manufactured by TOSOH CORPORATION, in which two apparatuses, TSK-GEL SuperMultipore HZ-H, were connected in series).

A glass substrate was coated with the block copolymer solution by spin casting and dried by use of a heating plate. A block copolymer film was thus formed on the glass substrate.

Subsequently, the glass substrate formed having the block copolymer film was put in a desiccator. A dish, to which chloroform was added, was also put in the desiccator, and the desiccator was sealed or tightly closed with grease. The glass substrate was left for 24 hours at room temperature and subjected to the solvent annealing process. Concavities and convexities were formed in a surface of the block copolymer film.

A nickel layer was formed as a current seed layer by performing sputtering on the surface of the block copolymer film. Then, an electroforming process was performed on the glass substrate to precipitate nickel until the thickness thereof became 250 µm. The glass substrate was mechanically released from the nickel electroforming body obtained as described above. The nickel mold was thus obtained.

Subsequently, a PET film was coated with a fluorine-based UV curable resin. The fluorine-based UV curable resin was cured by irradiation with ultraviolet rays while the nickel mold was pressed thereagainst. After curing of the resin, the nickel mold was released or peeled off from the cured resin. Accordingly, the film-like mold, which was formed from the PET substrate with the resin film to which the surface profile (surface shape) of the nickel mold had been transferred, was obtained.

Similar to Example 1, the solution of precursor of silica (sol) was prepared, and a surface of a glass substrate was coated with the solution to form the precursor solution film.

The film-like mold was pressed against the precursor solution film. Then, the precursor solution film was heated using a heating plate to cure the precursor solution film. Silica was thus formed. After that, the film-like mold was released from the silica. This resulted in concavities and convexities in a surface of the silica. The shape of concavities and convexities in the surface of the silica was reversed to that of concavities and convexities in the film-like mold.

Accordingly, the member including the glass substrate and the concave-convex structure layer formed from silica was produced.

Comparative Example 2

The antifogging member was produced by attaching an attachable or sealable film for bathroom mirror (Antifogging Film produced by Topre Corporation) to a glass substrate.

Comparative Example 3

The antifogging member was produced similarly to Example 1 except that a master formed from quartz (produced by NTT Advanced Technology Corporation) was used instead of the Si wafer in which concavities and convexities were formed in the surface thereof. A line and space pattern (L&S pattern) was formed in a surface of the master formed from quartz, wherein the (line) width of the convex portion was 100 nm, the (space) width of the concave portion was 100 nm, the depth of concavities and convexities was 250 nm, and the line length was 8, 000 µm. The cross-section of each convex portion of the L&S pattern had a rectangular shape. Concavities and convexities having similar dimensions as the master were formed in a surface of the antifogging member produced.

Comparative Example 4

The antifogging member was produced similarly to Example 1 except that a master formed from quartz was used instead of the Si wafer in which concavities and convexities were formed in the surface thereof. A line and space pattern (L&S pattern) was formed in a surface of the master formed from quartz, wherein the (line) width of the convex portion was 100 nm, the (space) width of the concave portion was 80 nm, the depth of concavities and convexities was 130 nm, and the line length was 8, 000 µm. The cross-section of each convex portion of the L&S pattern had a rectangular shape. Concavities and convexities having similar dimensions as the master were formed in a surface of the antifogging member produced.

(1) Concave-Convex Shape

The cross-sectional shape of the antifogging member in each of Examples 1 to 7 and the cross-sectional shape of the member in Comparative Example 1 were observed using a SEM. An average pitch $d_{ave}$ and an average depth $D_{ave}$ of concavities and convexities were obtained from each cross-sectional SEM image. Further, an average value $W_{ave}$ of widths of the convex portions (an average width of the convex portions) at a position lower than the top of the convex portions by $D_{ave}/2$ was obtained from the cross-sectional SEM image of the antifogging member in each of Examples 1 to 7. Further, $W_{ave}/d_{ave}$ was calculated in each of Examples 1 to 7. Table 1 shows the results.

The concave-convex surface of the antifogging member in each of Examples 1 to 7 and the concave-convex surface of the member in Comparative Example 1 were subjected to in-plan SEM observation. The concave-convex surface in each of Examples 1 to 4 was formed from multiple concave portions and a convex portion that continued two-dimensionally to surround the concave portions. The concave-convex surface in each of Examples 5 to 7 and Comparative Example 1 was formed from multiple convex portions and a concave portion that continued two-dimensionally to surround the convex portions. Table 1 shows the concave-convex shapes in Examples 1 to 7 and Comparative Example 1. In Table 1, the case in which the concave-convex surface was formed from the concave portions and the convex portion that continued two-dimensionally to surround the concave portions is referred to as a "concave-convex shape A", and the case in which the concave-convex surface was formed from the convex portions and the concave portion that continued two-dimensionally to surround the convex portions is referred to as a "concave-convex shape B". FIG. 3 shows the planar SEM image of the antifogging member in Example 1, and FIG. 2 shows the planar SEM image of the antifogging member in Example 6.

A square area having a side 40 or more times the average pitch of the concavities and convexities was cut out from the planar SEM image in each of Examples 5 to 7 and Comparative Example 1. The cut-out image was binarized using software for image processing and image analysis (ImageJ). Further, the circumferential lengths of white portions (convex portions) not brought into contact with the outer circumference of the image were determined using the software for image processing and image analysis. Then, a ratio $P_B/P_A$ of the total $P_A$ of all the circumferential lengths (i.e., the total of the circumferential lengths of the convex portions) to the total $P_B$ of circumferential lengths that were not more than seven times the average pitch of concavities and convexities (i.e., the total of the circumferential lengths of the convex portions that were not more than seven times the average pitch of concavities and convexities) was calculated. The values of $P_B/P_A$ are shown in Table 1.

TABLE 1

|  | Average pitch $d_{ave}$ (nm) | Average depth $D_{ave}$ (nm) | Average width of convex portions $W_{ave}$ (nm) | $W_{ave}/d_{ave}$ (%) | Concave-convex shape | $P_B/P_A$ (%) |
| --- | --- | --- | --- | --- | --- | --- |
| Example 1 | 200 | 250 | 54 | 27 | A | |
| Example 2 | 180 | 280 | 41 | 23 | A | |
| Example 3 | 200 | 130 | 54 | 27 | A | |
| Example 4 | 180 | 140 | 45 | 25 | A | |
| Example 5 | 200 | 120 | 106 | 53 | B | 45 |
| Example 6 | 180 | 130 | 99 | 55 | B | 7.6 |
| Example 7 | 180 | 12 | 99 | 55 | B | 7.6 |
| Comparative Example 1 | 470 | 91 | | | B | 0.7 |

(2) Antifogging Properties

The member in each of Examples 1 to 7 and Comparative Example 2 was put in a place separated from a vapor outlet of facial equipment (Steamer Nanocare EH-SA37 produced by Panasonic Corporation) by 3 cm for 3 seconds or 1 minute. Then, an image was put behind each member by 10 cm, and the image was visually observed through the concave-convex surface of each member. Table 2 shows the results thereof, wherein the case in which the image was visually observed without being fogged both after vapor had been applied to the member for 3 seconds and after vapor had been applied to the member for 1 minute is indicated by "++", the case in which the image was fogged by waterdrops after vapor had been applied to the member for 3 seconds, but the image was visually observed without being fogged after vapor had been applied to the member for 1 minute is indicated by "+", and the case in which the image was fogged by waterdrops both after vapor had been applied to the member for 3 seconds and after vapor had been applied to the member for 1 minute is indicated by "−".

When using the member in Comparative Example 2, the image was fogged by waterdrops both after vapor had been applied to the member for 3 seconds and after vapor had been applied to the member for 1 minute, and thus the antifogging properties were insufficient. When using the member in each of Examples 1 to 7, the image was visually observed without being fogged after vapor had been applied to the member for 1 minute, and thus the antifogging properties were good. When using the member in each of Examples 5 and 6, the image was visually observed without being fogged both after vapor had been applied to the member for 3 seconds and after vapor had been applied to the member for 1 minute, and thus the antifogging properties were very good. The reason why the image was fogged by waterdrops after vapor had been applied to the member in Example 7 for 3 seconds is considered as that the average depth of concavities and convexities was small. The reason why the antifogging properties in each of Examples 5 and 6 were very good is considered as that the concave-convex surface was formed from the convex portions and the concave portion that continued two-dimensionally to surround the convex portions. A waterdrop spreads over such a concave-convex surface quickly, and the waterdrop and a nearby waterdrop unite each other to form a waterdrop that is large enough for not scattering light.

(3) Abrasion Resistance 3-1) First Abrasion Resistance Test

A sponge (Sponge Stick produced by AION Co., Ltd.) dampened with water was attached to a flat indenter (φ12 mm) of a surface property tester (TriboGear TYPE: 38 produced by SHINTO Scientific Co., ltd.), and the concave-convex surface of the antifogging member in each of Examples 1 to 6 and Comparative Example 3 was rubbed with the sponge. The surface was rubbed under the following conditions: a moving velocity of 1,800 mm/min., a moving distance of 25.0 mm, a reciprocation count (the number of times of reciprocation) of five. The rubbing direction of the antifogging member in Comparative Example 3 was a direction perpendicular to the extending direction of the line-and-space in the concave-convex surface. After rubbing the concave-convex surface, whether the concave-convex surface of the antifogging member had been damaged was observed visually. The case in which the concave-convex surface had no damage was determined as "pass", and the case in which the concave-convex surface had a damage was determined as "failure".

3-2) Second Abrasion Resistance Test

The concave-convex surface of the antifogging member in each of Examples 1 to 6 and Comparative Example 3 was rubbed similarly to the first abrasion resistance test, except that Scotch-Brite SS-72KE produced by 3M was used as a sponge instead of Sponge Stick produced by AION Co., Ltd., and that the moving velocity was changed to 2400 mm/min. Whether the concave-convex surface of the antifogging member had been damaged was observed visually. The case in which the concave-convex surface had no damage was determined as "pass", and the case in which the concave-convex surface had a damage was determined as "failure". Since the sponge used in the second abrasion resistance test was harder than the sponge used in the first abrasion resistance test, passing the second abrasion resistance test was more difficult than passing the first abrasion resistance test.

Table 2 shows the evaluation results of abrasion resistance, wherein the case in which the antifogging member passed both the first abrasion resistance test and the second abrasion resistance test is indicated by "++", the case in which the antifogging member passed the first abrasion resistance test, but failed the second abrasion resistance test is indicated by "+", and the case in which the antifogging member failed both the first abrasion resistance test and the second abrasion resistance test is indicated by "-".

The antifogging member in Comparative Example 3 failed both the first abrasion resistance test and the second abrasion resistance test. It is considered that the convex portions collapsed or fell down when the concave-convex surface was rubbed with the sponge in the direction perpendicular to the extending direction of each convex portion, resulting in the damage in the concave-convex surface. The antifogging member in each of Examples 1 to 6 passed the first abrasion resistance test. It is considered that the convex portion(s) in the antifogging member of each of Examples 1 to 6 extended in random directions as viewed in plan view, and thus the convex portion(s) did not collapse or fall down after being rubbed and no damage was caused. The antifogging member in each of Examples 5 and 6 passed the second abrasion resistance test. It is considered that the average width of convex portions in each of Examples 5 and 6 was not less than 50% of the average pitch, and thus the width of each convex portion was sufficiently large.

(4) Haze

The haze of the member in each of Examples 1, 3-6 and Comparative Example 1 was measured using a haze meter (NDH5000 produced by NIPPON DENSHOKU INDUSTRIES, CO., LTD). Table 2 shows the measurement results. The haze in Comparative Example 1 was 1.86% and the haze in each of Examples 1 and 3-6 was less than 1.5%. The results show that a haze of less than 1.5% can be achieved by making the average pitch of concavities and convexities not more than 250 nm. The antifogging member in each of Examples 1, 3, 4 and 6 had a haze of less than 1%. The results show that a haze of less than 1% can be achieved when the concave-convex surface of the antifogging member had the planar structure in which the convex portion continued two-dimensionally to surround independent concave portions, and when the concave-convex surface of the antifogging member had the planar structure in which the concave portion continued two-dimensionally to surround independent convex portions as well as the total of perimeters of convex portions included in the independent convex portions and having a perimeter of not more than seven times the average pitch of concavities and convexities was not more than 10% of the total of perimeters of the independent convex portions.

TABLE 2

|  | Antifogging properties | Abrasion resistance | Haze (%) |
| --- | --- | --- | --- |
| Example 1 | + | + | 0.83 |
| Example 2 | + | + |  |
| Example 3 | + | + | 0.85 |
| Example 4 | + | + | 0.32 |
| Example 5 | ++ | ++ | 1.47 |
| Example 6 | ++ | ++ | 0.42 |
| Example 7 | + |  |  |
| Comparative Example 1 |  |  | 1.86 |
| Comparative Example 2 | − |  |  |
| Comparative Example 3 |  | − |  |

(5) Transmittance and Chromaticity (Color, Tinge)

In the antifogging member of Example 1, the average transmittance at wavelengths 300 to 800 nm was measured using an ultraviolet-visible near-infrared spectral photometer (V7100 produced by JASCO corporation). The transmittance was 91%, which was approximately equal to the transmittance (90%) of an unprocessed glass substrate.

In the antifogging member in each of Examples 1, 6 and Comparative Examples 3, 4, a polar angle θ, luminous transmittance Y at an azimuth angle φ, and CIE chromaticity coordinate values (x,y) of transmitted light obtained when light from a light source of D65 became incident on the antifogging member, those of which were indicated in Table 3, were calculated through simulation using an RCWA-based solver (DiffractMod produced by Synopsys Inc.). Table 2 shows the calculation results. In the antifogging member in each of Comparative Examples 3 and 4, the azimuth angle φ in the direction perpendicular to the extending direction of the line-and-space in the concave-convex surface was 0°. The average pitch and average depth of concavities and convexities in Example 1 were equivalent to those in Comparative Example 3. Similarly, the average pitch and average depth of concavities and convexities in Example 6 were equivalent to those in Comparative Example 4.

The transmittance and chromaticity of the antifogging member in Example 1 where the polar angle θ was 0° and the azimuth angle φ was 0° were equivalent to those in Comparative Example 3. Similarly, the transmittance and chromaticity of the antifogging member in Example 6 where the polar angle θ was 0° and the azimuth angle φ was 0° were equivalent to those in Comparative Example 4.

The transmittance and chromaticity of the antifogging member in each of Examples 1 and 6 where the polar angle θ was 75° were constant in a range of the azimuth angle φ was 0° to 90°. Namely, the transmittance and chromaticity of the antifogging member in each of Examples 1 and 6 did not depend on the azimuth angle.

The transmittance and chromaticity of the antifogging member in Comparative Example 3 where the polar angle θ was 75° greatly varied between when the azimuth angle φ was 0° and when the azimuth angle φ was 90°. Specifically, the transmittance where (θ, φ)=(75°, 0°) was satisfied was lower, by approximately 7%, than the transmittance where (θ, φ)=(75°, 90°) was satisfied. Namely, in the antifogging member in Comparative Example 3, the transmittance in the direction perpendicular to the extending direction of the line-and-space (φ=0°) was lower than the transmittance in the direction parallel to the extending direction of the line-and-space (φ=90°). When the chromaticity of the antifogging member in Comparative Example 3 where (θ, φ)=(75°, 0°) was satisfied, was compared with the chromaticity of the antifogging member in Comparative Example 3 where (θ, φ)=(75°, 90°) was satisfied, both the difference in chromaticity in the X coordinates and the difference in chromaticity in the Y coordinates were approximately 0.02. Namely, the chromaticity of the antifogging member in Comparative Example 3 greatly varied depending on the azimuth angle.

Similarly, in the antifogging member in Comparative Example 4, the transmittance and chromaticity where the polar angle θ was 75° greatly varied between when the azimuth angle φ was 0° and when the azimuth angle φ was 90°. Specifically, the transmittance where (θ, φ)=(75°, 0°) was satisfied was lower, by approximately 4%, than the transmittance where (θ, φ)=(75°, 90°) was satisfied. Namely, in the antifogging member in Comparative Example 4, the transmittance in the direction perpendicular to the extending direction of the line-and-space (φ=0°) was lower than the transmittance in the direction parallel to the extending direction of the line-and-space (φ=90°). When the chromaticity of the antifogging member in Comparative Example 4 where (θ, φ)=(75°, 0°) was satisfied, was compared with the chromaticity of the antifogging member in Comparative Example 4 where (θ, φ)=(75°, 90°) was satisfied, the difference in chromaticity in the X coordinates was 0.007 and the difference in chromaticity in the Y coordinates was 0.009. Namely, the chromaticity of the antifogging member in Comparative Example 4 greatly varied depending on the azimuth angle.

In short, the transmittance and chromaticity of the antifogging member in each of Comparative Examples 3 and 4 depended on the azimuth angle.

The difference between the transmittance and chromaticity of the antifogging member in Example 1 when the polar angle θ was 0° and the transmittance and chromaticity of the antifogging member in Example 1 when the polar angle θ was 75° was smaller than the difference between the transmittance and chromaticity of the antifogging member in Comparative Example 3 when (θ, φ)=(0°, 0°) was satisfied and the transmittance and chromaticity of the antifogging member in Comparative Example 3 when (θ, φ)=(75°, 0°) was satisfied. Namely, the difference between the transmittance and chromaticity of the antifogging member in Example 1 when the antifogging member was viewed obliquely and the transmittance and chromaticity of the antifogging member in Example 1 when the antifogging member was viewed from the vertical direction was smaller than that of the antifogging member in Comparative Example 3.

Similarly, the difference between the transmittance and chromaticity of the antifogging member in Example 6 when the polar angle θ was 0° and the transmittance and chromaticity of the antifogging member in Example 6 when the polar angle θ was 75° was smaller than the difference between the transmittance and chromaticity of the antifogging member in Comparative Example 4 when (θ, φ)=(0°, 0°) was satisfied and the transmittance and chromaticity of the antifogging member in Comparative Example 4 when (θ, φ)=(75°, 0°) was satisfied. Namely, the difference between the transmittance and chromaticity of the antifogging member in Example 6 when the antifogging member was viewed obliquely and the transmittance and chromaticity of the antifogging member in Example 6 when the antifogging member was viewed from the vertical direction was smaller than that of the antifogging member in Comparative Example 4.

TABLE 3

|  | Polar angle θ (°) | Azimuth angle φ (°) | Transmittance Y (%) | Chromaticity coordinate x | Chromaticity coordinate y |
|---|---|---|---|---|---|
| Example 1 | 0 | 0 | 96.6 | 0.319 | 0.343 |
|  | 75 | 0-90 | 92.5 | 0.330 | 0.361 |
| Example 6 | 0 | 0 | 99.5 | 0.313 | 0.329 |
|  | 75 | 0-90 | 84.1 | 0.310 | 0.328 |

TABLE 3-continued

|  | Polar angle θ (°) | Azimuth angle φ (°) | Transmittance Y (%) | Chromaticity coordinate x | Chromaticity coordinate y |
|---|---|---|---|---|---|
| Comparative Example 3 | 0 | 0 | 96.6 | 0.319 | 0.343 |
|  | 75 | 0 | 87.9 | 0.343 | 0.377 |
|  | 75 | 90 | 95.2 | 0.323 | 0.354 |
| Comparative Example 4 | 0 | 0 | 99.5 | 0.313 | 0.329 |
|  | 75 | 0 | 82.0 | 0.315 | 0.334 |
|  | 75 | 90 | 85.7 | 0.308 | 0.325 |

The antifogging member of the present invention has good antifogging properties, high abrasion resistance, a small haze, and a small difference in transmittance and chromaticity between when viewed obliquely and when viewed from the vertical direction, and the transmittance and chromaticity do not depend on the azimuth angle. The antifogging member of the present invention can thus be used for a variety of uses such as mirrors including, for example, vehicle mirrors, bathroom mirrors, washroom mirrors, dental mirrors, and road mirrors; lenses including, for example, lenses for eyewear, optical lenses, camera lenses, endoscopic lenses, lightening lenses, semiconductor lenses, and lenses for copying machines; prisms; glass including, for example, building windows and glass for other building materials; window glass for vehicles (e.g., automobiles, rail vehicles, aircrafts, and vessels); windshield glass for vehicles; goggles including, for example, protective goggles and sports goggles; shields for protective masks, sports masks, helmets, and the like; glass for display cases used for frozen foods and the like; cover glass for measurement instruments; and films to be applied or attached to surfaces of those goods or objects.

REFERENCE SIGNS LIST

40: substrate, 50: concave-convex structure layer, 60: convex portion, 70: concave portion, 80: concave-convex surface, 100: antifogging member

What is claimed is:

1. An antifogging member having a concave and convex surface defined from a convex portion and a concave portion, wherein
a Fourier-transformed image obtained by performing a two-dimensional fast Fourier-transform processing on an observation image of the concave and convex surface shows a circular or annular pattern substantially centered at an origin at which an absolute value of wavenumber is 0 μm$^{-1}$,
the convex portion and the concave portion extend in random directions as viewed in plan view,
an average pitch of concavities and convexities in the concave and convex surface is in a range of 50 to 250 nm,
a contact angle of water on a flat and smooth surface formed from a material forming the concave and convex surface is not more than 90°,
the concave and convex surface is defined from a plurality of convex portions and a concave portion surrounding the plurality of convex portions, and
a total of perimeters of convex portions included in the plurality of convex portions and having a perimeter of not more than seven times the average pitch of the concavities and convexities is not more than 10% of a total of perimeters of the plurality of convex portions.

2. The antifogging member according to claim 1, wherein an average depth of the concavities and convexities in the concave and convex surface is in a range of 15 to 500 nm.

3. The antifogging member according to claim 1, wherein the concave and convex surface is defined from a plurality of concave portions and a convex portion surrounding the plurality of concave portions.

4. The antifogging member according to claim 1, wherein a width of the convex portion at a position lower than a top of the convex portion by D (depth of concavities and convexities)/2 is in a range of 20 to 95% of the average pitch of the concavities and convexities.

5. The antifogging member according to claim 4, wherein the width of the convex portion at the position lower than the top of the convex portion by D (depth of concavities and convexities)/2 is in a range of 50 to 95% of the average pitch of the concavities and convexities.

* * * * *